United States Patent Office 3,119,831
Patented Jan. 28, 1964

3,119,831
N-2-PYRIDYL-N'-(n-OCTYL OR n-DODECYL)-
FORMAMIDINE
Ronald Frederick Homer, Wokingham, England, assignor to Imperial Chemical Industries Limited, London, England, a corporation of Great Britain
No Drawing. Filed June 29, 1960, Ser. No. 39,461
Claims priority, application Great Britain July 10, 1959
2 Claims. (Cl. 260—296)

This invention relates to new amidines which possess herbicidal properties, and to herbicidal compositions containing them.

The invention provides amidines of the formula:

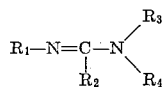

where $R_1$ is a substituted or unsubstituted phenyl radical, or a pyridyl radical; $R_2$ is a hydrogen atom or a methyl radical; $R_3$ is an aliphatic hydrocarbon radical having from 4 to 12 carbon atoms; and $R_4$ is a hydrogen atom or an aliphatic hydrocarbon radical, provided that where $R_4$ is an aliphatic hydrocarbon radical the sum of carbon atoms of $R_4$ and $R_3$ taken together is not greater than 16; and acid addition salts of said amidines.

Where the group $R_1$ is a substituted phenyl radical the substituent can be, for example, one or more of the following: an atom of a halogen for example chlorine; a lower alkyl radical, for example methyl or ethyl; and a lower alkoxy radical, for example methoxy or ethoxy.

Compounds of particular interest because of their herbicidal properties are those in which $R_4$ is a hydrogen atom.

In general the compounds of the invention which show pronounced herbicidal activity are those in which the total number of carbon atoms contained in groups $R_3$ and $R_4$ taken together is from 4 to 10 (especially where $R_4$ is a hydrogen atom).

The invention also includes a process for the preparation of amidines in which a compound of the formula:

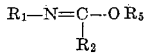

is reacted with an aliphatic amine of the formula:

where $R_1$, $R_2$, $R_3$ and $R_4$ have the meanings given to them above, and $R_5$ is a lower alkyl radical for instance methyl or ethyl. The process can be performed using a simple mixture of the reactants, or by using the reactants in a suitable solvent or diluent such as a lower alkanol, for instance ethanol; or a hydrocarbon solvent, for instance, toluene or benzene. The temperature at which the process is performed depends largely upon the reactivity of the reactants and, where a solvent or diluent is used, upon the nature of that solvent or diluent. In general the preferred temperature is from 80° C. to 150° C. With regard to the proportions of reactants used, it has been found convenient to use the amine in slight excess.

Since the compounds of this invention show herbicidal activity, the invention also includes herbicidal compositions containing as active ingredient, an amidine of the invention or an acid addition salt thereof. The composition can, for example, be a liquid composition obtained by dissolving or dispersing the active ingredient in a suitable liquid, for example, water or an organic liquid. The compounds of the invention are, in general, not soluble in water to an appreciable extent, and thus aqueous solutions are not readily prepared. Satisfactory aqueous compositions, however, can be prepared by dissolving the compound in a suitable organic solvent, for example, methanol, tetrahydrofurfuryl alcohol, β-ethoxyethanol, ethylene glycol, an alkylated benzene or kerosene. The herbicidal composition can be in the form of a powder in which the active ingredient is in admixture with a powder diluent. The pesticidal compositions, whether liquid or powder, can contain a wetting or dispersing agent to facilitate their use as spray compositions.

The invention also includes a method for the destruction or control of vegetation, in which the vegetation is treated with a herbicidal amount of a compound or herbicidal composition as described above.

The invention is illustrated by the following examples in which (unless otherwise stated) the parts referred to are parts by weight.

EXAMPLE 1

This example describes the preparation of N-phenyl-N'-n-hexylformamidine.

A mixture of O-ethylisoformanilide (15 parts:1 mole) and n-hexylamine (11 parts:1.1 mole) dissolved in toluene (50 parts) was heated under reflux for 2 hours. The toluene was then removed by distillation under reduced pressure leaving an oily residue from which was distilled N-phenyl-N'-n-hexylformamidine, B.P. 130–132° C./0.3 mm.

EXAMPLE 2

This example describes the preparation of N-m-chlorophenyl-N'-n-octylformamidine.

A mixture of m-chloro O-ethylisoformanilide (9 parts) and n-octylamine (6.8 parts) dissolved in toluene (20 parts) was heated under reflux for 2 hours. The toluene was then removed by distillation under reduced pressure leaving a residue from which was distilled N-m-chlorophenyl-N'-n-octylformamidine, B.P. 162–170° C./0.5 mm.

EXAMPLES 3–10

A number of other N-phenyl formamidines (shown in Table 1 below as Examples 3–10) were prepared by the process of Example 1, but using the appropriate aliphatic amine instead of the n-hexylamine used in that example.

Table 1

| Example No. | Compound | Boiling point (° C./mm.) |
|---|---|---|
| 3 | N-phenyl-N'-n-butylformamidine | 104–106/0.1 |
| 4 | N-phenyl-N'-n-octylformamidine | 128–138/0.1 |
| 5 | N-phenyl-N'-n-decylformamidine | 158–163/0.03 |
| 6 | N-phenyl-N'-n-dodecylformamidine | 170–174/0.075 |
| 7 | N-phenyl-N':N'-di-n-propyl formamidine | 108–114/0.35 |
| 8 | N-phenyl-N':N'-di-n-butyl formamidine | 115–120/0.25 |
| 9 | N-phenyl-N':N'-di-iso-butyl formamidine | 100–102/0.1 |
| 10 | N-phenyl-N':N'-di-n-amyl formamidine | 130–138/0.25 |

EXAMPLES 11–42

A further large number of N-phenyl formamidines substituted in the phenyl radical are set out below in Table 2 as Examples 11–42. These substances were prepared by processes analogous to that described in Example 1, but using the appropriate substituted O-ethylisoformanilide instead of O-ethylisoformanilide, and using the appropriate aliphatic amine instead of n-hexylamine.

Table 2

| Example No. | Compound | Boiling point (°C./mm.) |
| --- | --- | --- |
| 11 | N-o-chlorophenyl-N'-n-hexylformamidine | 140–148/.025 |
| 12 | N-o-chlorophenyl-N'-n-octylformamidine | 164–170/.25 |
| 13 | N-m-chlorophenyl-N'-n-hexylformamidine | 137–145/.25 |
| 14 | N-m-chlorophenyl-N'-n-octylformamidine | 162–170/.5 |
| 15 | N-p-chlorophenyl-N'-n-hexylformamidine | 136–144/.1 |
| 16 | N-p-chlorophenyl-N'-n-octylformamidine | 162–164/.25 |
| 17 | N-3:4-dichlorophenyl-N'-n-hexylformamidine | 168–174/.4 |
| 18 | N-3:4-dichlorophenyl-N'-n-octylformamidine | 168–174/.15 |
| 19 | N-2:4-dichlorophenyl-N'-n-butylformamidine | 132–136/.05 |
| 20 | N-2:4-dichlorophenyl-N'-n-octylformamidine | 168–174/.05 |
| 21 | N-2:4:5-trichlorophenyl-N'-n-butylformamidine | 144–148/.025 |
| 22 | N-2:4:5-trichlorophenyl-N'-n-octylformamidine | 164/.005 |
| 23 | N-o-tolyl-N'-n-butyl formamidine | 105–110/.25 |
| 24 | N-o-tolyl-N'-n-hexylformamidine | 128–136/.05 |
| 25 | N-o-tolyl-N'-n-octylformamidine | 172–175/.1 |
| 26 | N-m-tolyl-N'-n-hexylformamidine | 130–140/0.1 |
| 27 | N-p-tolyl-N'-n-hexylformamidine | 146–152/0.1 |
| 28 | N-p-tolyl-N'-n-octylformamidine | 174–178/0.1 |
| 29 | N-2:6-dimethylphenyl-N'-n-butylformamidine | 110–120/.01 |
| 30 | N-2:6-dimethylphenyl-N'-n-hexylformamidine | 147–154/.8 |
| 31 | N-2:6-dimethylphenyl-N'-n-octylformamidine | 154–158/0.25 |
| 32 | N-2:4-dimethylphenyl-N'-n-butylformamidine | 114–121/0.1 |
| 33 | N-2:4-dimethylphenyl-N'-n-hexylformamidine | 128–140/.075 |
| 34 | N-2:3-dimethylphenyl-N'-n-butylformamidine | 114–123/.05 |
| 35 | N-2:3-dimethylphenyl-N'-n-hexylformamidine | 143–147/.05 |
| 36 | N-2:5-dimethylphenyl-N'-n-butylformamidine | 116–124/.18 |
| 37 | N-2:5-dimethylphenyl-N'-n-hexylformamidine | 140–145/.02 |
| 38 | N-3:4-dimethylphenyl-N'-n-butylformamidine | 130–134/0.25 |
| 39 | N-3:4-dimethylphenyl-N'-n-hexylformamidine | 120–133/0.1 |
| 40 | N-p-ethoxyphenyl-N'-n-hexylformamidine | 164–170/0.5 |
| 41 | N-p-dimethylaminophenyl-N'-n-butylformamidine | 90/.005 |
| 42 | N-p-dimethylaminophenyl-N'-n-octylformamidine | 140/.005 |

EXAMPLE 43

This example describes the preparation of N-phenyl-N'-dodecylacetamidine.

A mixture of O-ethylisoacetanilide (8.2 parts) and n dodecylamine (6.8 parts) dissolved in toluene (25 parts) was heated under reflux for 2 hours. The toluene was then removed by distillation under reduced pressure leaving a residue from which was distilled N-phenyl-N'-dodecylacetamidine, B.P. 150–160° C./0.001 mm.

EXAMPLES 44 AND 45

Two other N-phenyl acetamidines (shown in Table 3 below as Examples 44 and 45) were prepared by the process of Example 43, but using n-hexylamine and n-octylamine respectively instead of n-dodecylamine.

Table 3

| Example No. | Compound | Boiling point (° C./mm.) |
| --- | --- | --- |
| 44 | N-phenyl-N'-n-hexylacetamidine | 114–120/.05 |
| 45 | N-phenyl-N'-n-octylacetamidine | 130–136/.005 |

EXAMPLE 46

This example describes the preparation of N-2-pyridyl-N'-n-butylformamidine.

A mixture of 2-ethoxymethyleneiminopyridine (7 parts) and n-butylamine (4 parts) was dissolved in toluene (25 parts) and the resulting solution heated under reflux for 2 hours. The toluene was then removed by distillation under reduced pressure and the residue distilled to give N-2-pyridyl-N'-butylformamidine, B.P. 176–180° C./18 mm.

EXAMPLES 47–49

Three further N-2-pyridylformamidines, shown in Table 4 below as Examples 47–49) were prepared by the process of Example 46, but using the appropriate aliphatic amine instead of the butyl amine of that Example.

Table 4

| Example No. | Compound | Boiling point (° C./mm.) |
| --- | --- | --- |
| 47 | N-2-pyridyl-N'-n-hexylformamidine | 124–130/0.1 |
| 48 | N-2-pyridyl-N'-n-octylformamidine | 168–172/0.1 |
| 49 | N-2-pyridyl-N'-n-dodecylformamidine | 178–182/0.001 |

The herbicidal properties of a large number of amidines of this invention are illustrated by the screening tests described below in which the compounds have been tested as herbicides by being sprayed in the form of liquid compositions on the following plant species: wheat (*Triticum* spp.), wild oats (*Avena* spp.), mustard (*Brassica alba*), kale (*Brassica oleracea*), sugar beet (*Beta vulgaris*), red clover (*Trifolium pratense*) and cleavers (*Galium aparine*).

The herbicidal compositions tested were liquid compositions containing 0.05 lb. of amidine as active ingredient per gallon of water and the compositions were applied to the test plants at the rate of 100 gallons/acre, i.e. the active ingredient was applied at the rate of 5 lb./acre. The compositions contained also 0.3% by weight of a wetting agent consisting of a 27% aqueous solution of the condensation product of one mole of octyl cresol with 7–8 moles of ethylene oxide. Where the amidine used was water-soluble, the liquid composition was made simply by dissolving the amidine and the wetting agent in water; but amidines not sufficiently soluble in water were first dissolved in a small quantity of methanol and the resulting solution mixed with sufficient water to provide a liquid composition containing 0.05 lb. of amidine/gallon of water.

The results obtained are set out in Table 5 below in which the herbicidal activity of each of the compounds tested has a grading number from 0 to 4. These grading numbers relate to the effect of the test compounds on the plants sprayed and have the following meanings:

0 — Complete kill.
1 — Very severe damage with partial kill.
2 — Severe damage.
3 — Moderate damage.
4 — Slight damage.

Table 5

| Compound of Example No. | Wheat | Wild oats | Mustard | Kale | Sugar beet | Red clover | Cleavers |
|---|---|---|---|---|---|---|---|
| 3 | 3 | 3 | 1 | 1 | 3 | 4 | 3 |
| 1 | 3 | 3 | 0 | 1 | 0 | 1 | 1 |
| 6 | 3 | 3 | 0 | 0 | 0 | 2 | 3 |
| 4 | 3 | 3 | 0 | 1 | 1 | 2 | 2 |
| 15 | 2 | 2 | 0 | 1 | 4 | 2 | 3 |
| 11 | 3 | 3 | 0 | 1 | 2 | 3 | 3 |
| 16 | 2 | 2 | 0 | 0 | 0 | 1 | 1 |
| 13 | 2 | 2 | 0 | 0 | 1 | 1 | 1 |
| 14 | 2 | 2 | 0 | 1 | 1 | 2 | 1 |
| 17 | 3 | 3 | 1 | 2 | 2 | 3 | 2 |
| 18 | 3 | 3 | 2 | 2 | 1 | 3 | 3 |
| 22[1] | 4 | 4 | 3 | 3 | 4 | 4 | 4 |
| 5[1] | 2 | 3 | 0 | 0 | 1 | 2 | 2 |
| 19 | 4 | 4 | 4 | 4 | 4 | 4 | 4 |
| 20 | 4 | 4 | 2 | 4 | 4 | 4 | 3 |
| 40 | 3 | 4 | 1 | 3 | 3 | 3 | 3 |
| 26 | 3 | 3 | 1 | 1 | 1 | 3 | 1 |
| 24 | 3 | 3 | 2 | 1 | 2 | 3 | 3 |
| 25 | 4 | 4 | 4 | 4 | 4 | 4 | 4 |
| 27 | 4 | 4 | 3 | 3 | 3 | 4 | 4 |
| 28 | 4 | 4 | 3 | 4 | 3 | 4 | 3 |
| 44 | 4 | 4 | 3 | 3 | 3 | 4 | 3 |
| 45 | 4 | 4 | 3 | 2 | 1 | 4 | 3 |
| 48 | 2 | 3 | 1 | 1 | 1 | 3 | 1 |
| 29 | 4 | 4 | 4 | 4 | 4 | 4 | 4 |
| 31 | 4 | 4 | 4 | 4 | 4 | 4 | 4 |
| 23 | 4 | 4 | 3 | 3 | 3 | 4 | 4 |
| 32 | 4 | 4 | 4 | 4 | 4 | 4 | 4 |
| 33 | 4 | 4 | 2 | 1 | 2 | 3 | 1 |
| 34 | 4 | 4 | 4 | 4 | 4 | 4 | 4 |
| 7 | 4 | 4 | 4 | 4 | 4 | 4 | 4 |
| 10 | 3 | 3 | 3 | 3 | 3 | 4 | 3 |
| 9 | 4 | 4 | 4 | 4 | 4 | 4 | 4 |
| 8 | 4 | 4 | 4 | 4 | 4 | 4 | 4 |
| 37 | 4 | 4 | 3 | 4 | 4 | 4 | 4 |
| 35 | 3 | 3 | 1 | 2 | 3 | 3 | 2 |
| 39 | 4 | 4 | 1 | 2 | 3 | 4 | 1 |
| 47 | 3 | 4 | 2 | 1 | 2 | 3 | 2 |
| 49 | 2 | 2 | 1 | 3 | 1 | 3 | 1 |

[1] Compound applied at the rate of 2-lb./acre.

What we claim is:
1. N-2-pyridyl-N'-n-octylformamidine.
2. N-2-pyridyl-N'-n-dodecylformamidine.

References Cited in the file of this patent
UNITED STATES PATENTS

| | | |
|---|---|---|
| 2,583,729 | Deanesley | Jan. 29, 1952 |
| 2,614,917 | Zukel et al. | Oct. 21, 1952 |
| 2,692,284 | Haury | Oct. 19, 1954 |
| 2,703,333 | Rowlands | Mar. 1, 1955 |
| 2,734,815 | Mowry et al. | Feb. 14, 1956 |
| 2,765,340 | Haury | Oct. 2, 1956 |
| 2,909,527 | Shapiro et al. | Oct. 20, 1959 |
| 2,924,604 | Steinhard et al. | Feb. 9, 1960 |

OTHER REFERENCES

Oxley et al.: J. Chem. Soc., 1948, pages 1514–27.
Mandel et al.: J. Am. Chem. Soc., vol. 76, pages 3978–82 (1954).
Bredereck et al.: Chem. Abstracts, vol. 53, col. 14995 (1959).
Dymek: Chem. Abstracts, volume 51, columns 4977–8 (1959).